March 17, 1925.

G. M. WHITE

BITLESS BRIDLE

Filed July 14, 1924

1,530,450

Inventor
George M. White.

By Clarence A. O'Brien
Attorney

Patented Mar. 17, 1925.

1,530,450

UNITED STATES PATENT OFFICE.

GEORGE M. WHITE, OF OTOWI, NEW MEXICO.

BITLESS BRIDLE.

Application filed July 14, 1924. Serial No. 725,903.

*To all whom it may concern:*

Be it known that I, GEORGE M. WHITE, a citizen of the United States, residing at Otowi, in the county of Sandoval and State of New Mexico, have invented certain new and useful Improvements in a Bitless Bridle, of which the following is a specification.

This invention relates to new and useful improvements in bitless bridles and has for its principal object to provide a simple and efficient device which dispenses with the disadvantages encountered in connection with the use of the ordinary bit which is normally disposed in the mouth of an animal.

Another important object of the invention is to provide a bitless bridle of the above mentioned character, which is of such a construction as to enable the animal upon which the same is placed to be driven, guided, and controlled without employing a bit which is received in the mouth of the animal.

A still further object of the invention is to provide a bitless bridle of the above mentioned character, which is simple in construction, inexpensive, strong and durable and when in use will not cause any discomfort to the animal.

Other objects and advantages of this invention will become apparent during the course of the following description.

Figure 1:
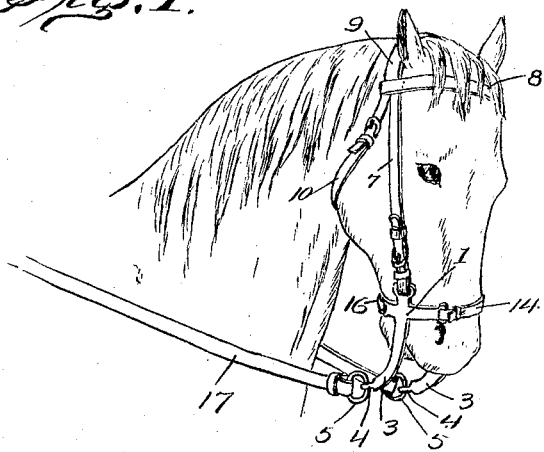
Figure 2:
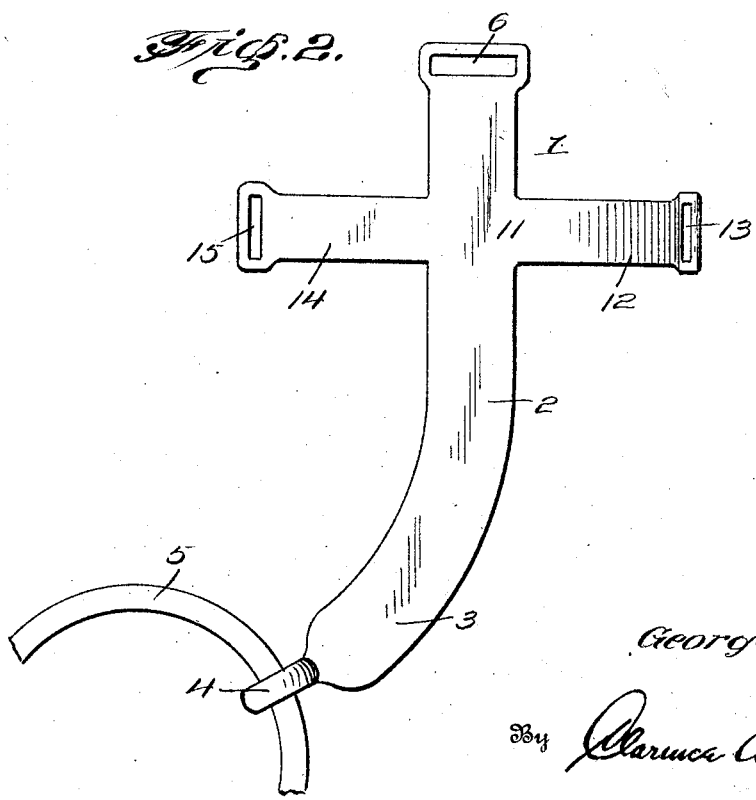

In the accompanying drawing forming a part of this specification and in which like numerals designate like parts throughout the same:

Figure 1 represents a perspective view of my improved bitless bridle showing the same in use, and Figure 2 is a detail side elevation of one of the levers.

In the drawing wherein for the purpose of illustration is shown the preferred embodiment of my invention, the numeral 1 designates the lever which is substantially of cruciform formation and in the present invention, a pair of such levers is provided, one lever being disposed on one side of the head of an animal adjacent the mouth while the other lever being arranged on the opposite side at the same place. As the construction of the levers are the same, the description of one is thought to suffice for the description of both. The vertical member of the cruciform lever 1 has its lower portion slightly curved as illustrated at 3 and terminates in the eye portion 4 through which extends the ring 5. The upper end of the vertical arm or member 2 is provided with a slot 6 whereby the supporting or cheek strap 7 which is arranged on each side of the head of the animal may be fastened thereto. The upper end of each cheek strap is connected to the brow band 8, the latter being associated with the head strap 9 and the throat latch 10. As the constructions of the aforementioned straps are well known in the art, a further detailed description thereof is not thought necessary.

The horizontally extending arm or member 11 of the cruciform shaped lever 1 is curved to conform to the shape of a portion of the head of the animal adjacent which the lever is arranged and supported in the manner clearly illustrated in Figure 1. The forward end 12 of the horizontal member or arm 11 extends over a portion of the nose of the animal and is provided at its end with a slot 13 which cooperates with the slot in the forward end of the horizontal arm of the lever on the other side of the head of the animal in supporting the nose strap 14, the latter extending over the nose of the animal in the manner clearly illustrated in Figure 1.

The other portion 14 of the horizontally extending arm extends beneath a portion of the lower jaw and is provided at its end with the slot 15 for cooperation with a similar slot provided in a similar portion of the horizontal arm on the lever on the other side of the head of the animal in supporting the chin strap 16.

The curved portions 3 of the lever extend below the mouth of the animal and slightly rearward thereof and the rings 5 which are carried thereby through the medium of the eye portion 4 provide a means for connecting to the bridle the driving reins 17.

The provision of a bitless bridle of the character above described will enable the drive to guide and control the animal without employing a bit which is received in the mouth of the animal thereby relieving the animal of any discomfort and furthermore preventing the inhuman treatment often experienced by the animal when the driving reins are jerked. A bitless bridle furthermore dispenses with the disadvantages encountered in connection with the use of the ordinary bit and by actuating the driving reins 17 in the desired manner, the movement of the animal may be readily and easily controlled.

The simplicity of which my bitless bridle is constructed enables the same to be readily and easily placed in position on the head of an animal and will furthermore be inexpensive in the construction thereof yet strong and durable.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A bitless bridle comprising a pair of levers of cruciform design, the lower ends of the vertical arms thereof being slightly curved rearwardly, a nose strap connecting the forward end of the horizontal arms of said levers, a chin strap connecting the rearwardly extending portions of the horizontal arms, supporting means attached to the upper end of the vertical arms, and driving rings connected to the lower curved portions of the vertical arms.

2. A bitless bridle of the class described comprising a pair of levers of cruciform design, the vertical arms thereof having their lower ends curved rearwardly and extending below the mouth of an animal, cheek straps connected to the upper ends of the vertical arms, the horizontal arms of said levers being curved to conform with the configuration of the sides of the head of the animal, a nose strap connecting the forward ends of the horizontal arms, a chin strap connecting the rear ends of the horizontal arms, and driving reins connected to the lower curved ends of the vertical arms.

3. A bitless bridle of the class described comprising a pair of levers of cruciform design, the vertical arms thereof having their lower ends curved rearwardly and extending below the mouth of an animal, cheek straps connected to the upper ends of the vertical arms, the horizontal arms of said levers being curved to conform with the configuration of the sides of the head of the animal, a nose strap connecting the forward ends of the horizontal arms, a chin strap connecting the rear ends of the horizontal arms, the lower curved ends of the vertical arms terminating in eye portions, rings carried thereby, and driving reins attached to said rings.

In testimony whereof I affix my signature.

GEORGE M. WHITE.